United States Patent [19]
Nomura

[11] Patent Number: 5,574,980
[45] Date of Patent: Nov. 12, 1996

[54] COMMUNICATION BASE STATION SYSTEM FOR TRANSMITTING DATA TO A MOVABLE BODY

[75] Inventor: Tominari Nomura, Tokyo, Japan

[73] Assignee: NEC Corporation, Tokyo, Japan

[21] Appl. No.: 265,722

[22] Filed: Jun. 24, 1994

[30] Foreign Application Priority Data

Jun. 24, 1993 [JP] Japan .................................. 5-153756

[51] Int. Cl.$^6$ ...................................................... H04B 1/04
[52] U.S. Cl. .............................. 455/63; 455/17; 455/103; 455/115
[58] Field of Search .................................. 455/9, 14, 17, 455/50.1, 53.1, 63, 103–105, 115, 127, 119

[56] References Cited

U.S. PATENT DOCUMENTS

| | | | |
|---|---|---|---|
| 5,115,514 | 5/1992 | Leslie | 455/17 |
| 5,163,181 | 11/1992 | Koontz | 455/103 |
| 5,295,138 | 3/1994 | Greenberg | 455/115 |

FOREIGN PATENT DOCUMENTS

| | | | |
|---|---|---|---|
| 3-109825 | 5/1991 | Japan . | |
| 5-335975 | 12/1993 | Japan | 455/127 |

Primary Examiner—Chi H. Pham
Attorney, Agent, or Firm—Foley & Lardner

[57] ABSTRACT

A communication base station system for transmitting data to a movable body includes a plurality of transmission sections, each of the transmission sections receiving a transmission data, modulating this received transmission data, and then converting the frequency of this modulated transmission data to a preset frequency and outputting a result. A control section monitors a status of use of the transmission sections, and if having confirmed at least two transmission sections that do not transmit any data, the control section outputs a specified signal instead of the transmission data to two transmission sections among the confirmed transmission sections. An amplification section collectively amplifies a plurality of output signals from the transmission section and a compensation circuit compensates for intermodulation distortion components generated in the amplification section based on an output of a transmission section that has received the specified signal and its respective transmission frequency. In the present invention configured as above, the two transmission sections that do not transmit any data receive a signal of specified pattern, these transmission sections that have received the signal of specified pattern generate output signals. Using these output signals, intermodulation distortion components caused by non-linearity of an amplifier are compensated for.

23 Claims, 2 Drawing Sheets

5,574,980

COMMUNICATION BASE STATION SYSTEM FOR TRANSMITTING DATA TO A MOVABLE BODY

BACKGROUND OF THE INVENTION

The present invention relates to a communication base station system, especially a communication base station system that receives transmission data, modulates the transmission data, converts the frequency of the modulated data to a preset transmission frequency, collectively amplifies the converted data and simultaneously compensates for intermodulation distortion components generated in this amplification step.

Conventionally, as shown in FIG. 2, a movable communication base station system comprises: orthogonal modulation sections $21_1$ to $21_n$ for receiving transmission data $X_1$ to $X_n$ and outputting modulated signals; n units of transmission sections $23_1$ to $23_n$ having frequency conversion sections $22_1$ to $22_n$ for receiving the modulated signals and performing frequency conversion; a frequency instruction section 24 for instructing a frequency to each of frequency conversion sections $22_1$ to $22_n$ to determine an output frequency of said n transmission sections; and a distortion-compensation-type common amplification section 25 for receiving outputs of n transmission sections $23_1$ to $23_n$ and collectively amplifying the outputs.

The distortion-compensation-type common amplification section 25 that collectively amplifies outputs of n transmission sections $23_1$ to $23_n$ generates intermodulation distortion components caused by the nonlinearity of the amplifier. The level of intermodulation distortion components increases in proportion to the square of the number of channels and the transmission power output from the transmission sections $23_1$ to $23_n$.

Accordingly, the distortion compensation circuit 26 is provided for improving intermodulation distortion components.

As an art for compensating distortion for the distortion compensation circuit 26, an art disclosed in Japanese Patent Laid-Open No.3-109825 (1991) is known.

In this art, for compensating distortion without interrupt of transmission, the control section 27 calculates a frequency generating distortion based on channels in use and the distortion compensation circuit 26 compensates for the distortion by using the calculated frequency and an output signal of a transmission section among the transmission sections $23_1$ to $23_n$ corresponding to this frequency.

However, the above-mentioned art can not provide accurate distortion compensation, because it uses a modulated signal that is being transmitted and varies irregularly for distortion compensation without interrupt of transmission.

SUMMARY OF THE INVENTION

It is an object of the present invention to provide a movable body communication base station which to accurately compensates for intermodulation distortion components caused by non-linearity of an amplifier.

Moreover, the object of the present invention is to provide a movable body communication base station which compensates for intermodulation distortion components caused by non-linearity of an amplifier without interrupt of transmission.

The present invention is achieved by a communication base station system for transmitting data to a movable body including:

a plurality of transmission sections, each one of the transmission sections receiving a transmission data, modulating the received transmission data, and then converting the frequency of the modulated transmission data to a preset frequency and outputting a result.

A control sections monitors a status of use of the transmission sections, and if having confirmed at least two transmission sections that are not transmitting any data, the control section outputs a specified signal instead of the transmission data to two of the transmission sections among the confirmed transmission sections.

An amplification section collectively amplifies a plurality of output signals from the transmission sections, and a compensation circuit compensates for intermodulation distortion components generated in the amplification section based on an output of a transmission section that has received the specified signal and the transmission frequency.

In the present invention configured as above, the two units of transmission sections that are not transmitting any data receive a signal of specified pattern, the transmission sections that have received the signal of the specified pattern generate output signals. Using the generated output signals, intermodulation distortion components caused by non-linearity of an amplifier are compensated for.

Therefore, a signal output from a transmission section is of constant amplitude and constant frequency, so accurate compensation is realized.

DETAILED DESCRIPTION OF THE PREFERRED EMBODIMENTS

The preferred embodiment of the present invention are explained, referring to the figures.

Figure 1:
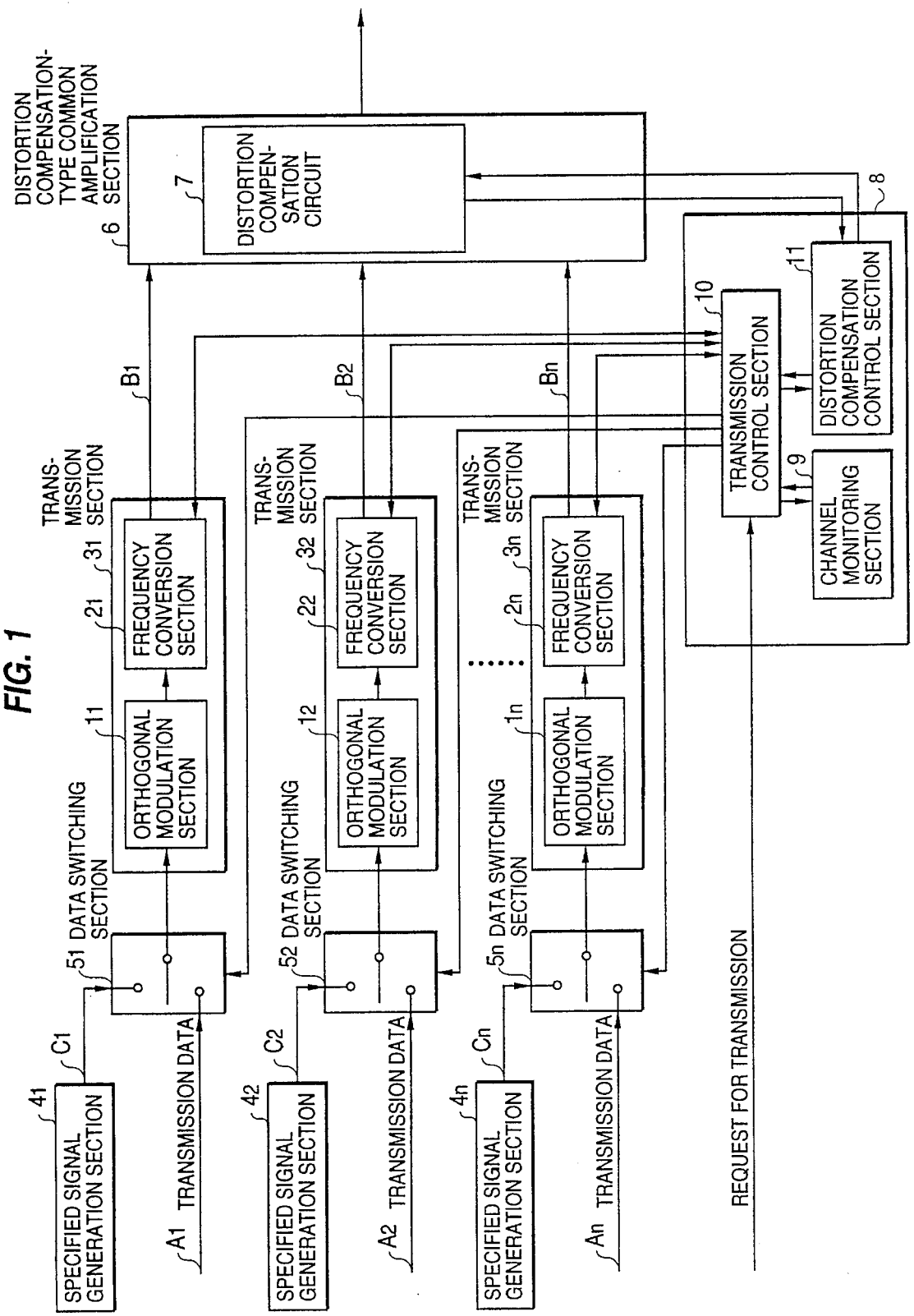
FIG.1 is a block diagram of an embodiment of a communication base station system according to the present invention.
Figure 2:
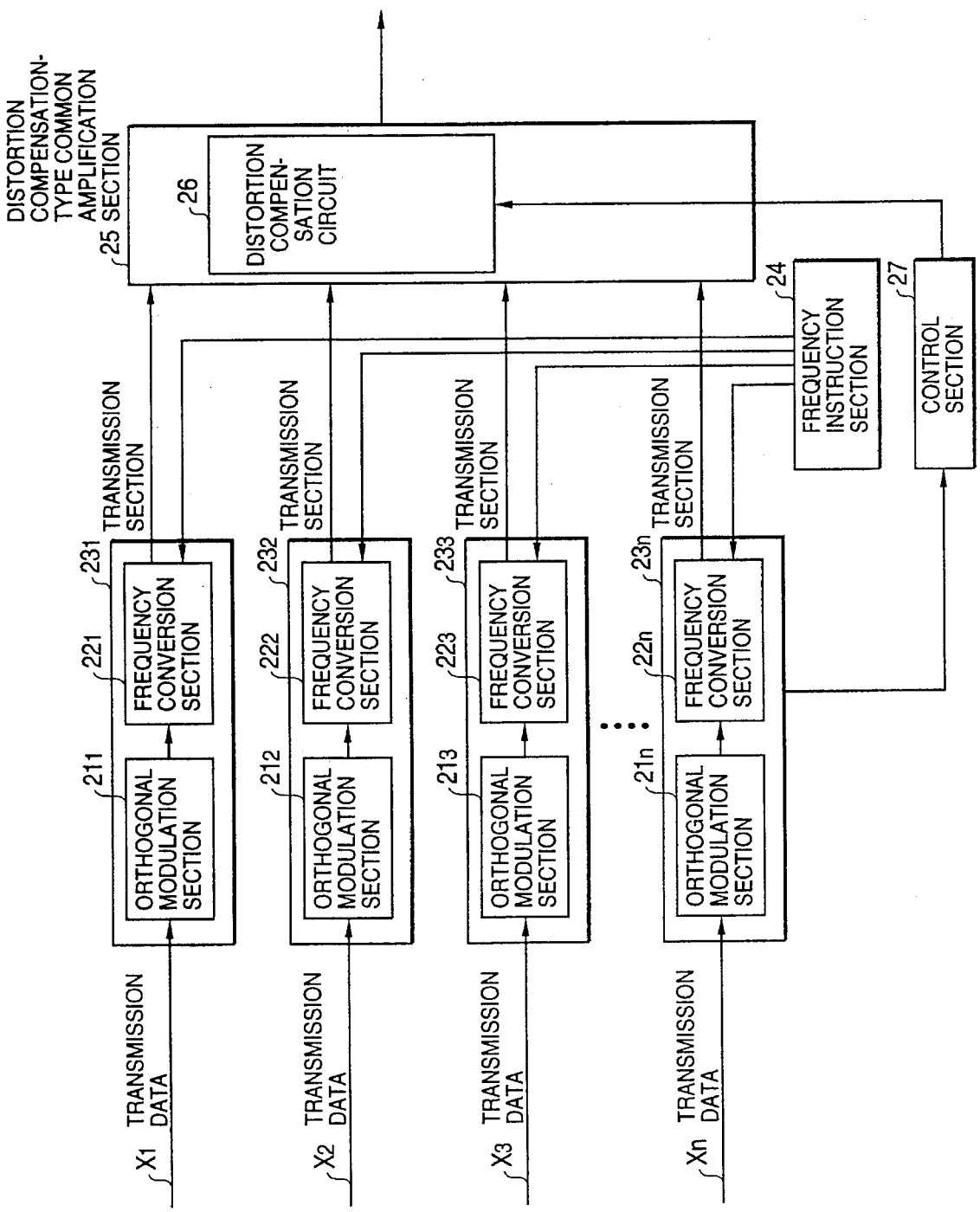
FIG.2 is a block diagram of a conventional communication base station system.

FIG.1 is a block diagram of an embodiment of a communication base station system according to the present invention.

$A_1$ to $A_n$ are transmission data.

$1_1$ to $1_n$ are orthogonal modulation sections that receive transmission data $A_1$ to $A_n$, orthogonally modulate the received data and output modulated signals.

$2_1$ to $2_n$ are frequency conversion sections that receive the modulated signals, convert them to a preset transmission frequency and generate output signals $B_1$ to $B_n$. Here, the transmission frequency is controlled as a channel, the frequency conversion sections $2_1$ to $2_n$ are assigned a channel by the transmission control section 10 described later and convert the frequency of the modulated signal to a transmission frequency corresponding to the assigned channel.

The transmission sections $3_1$ to $3_n$ comprise the orthogonal modulation sections $1_1$ to $1_n$ and the frequency conversion sections $2_1$ to $2_n$, respectively.

$4_1$ to $4_n$ are specified signal generation sections corresponding to the transmission sections $3_1$ to $3_n$ and generate signals of respective specified patterns $C_1$ to $C_n$ that make the respective corresponding transmission sections having received the specified signals among the transmission sections $3_1$ to $3_n$ transmit a signal of constant amplitude and constant frequency.

$5_1$ to $5_n$ are switching sections, corresponding to the transmission sections $3_1$ to $3_n$, which receive the transmission data $A_1$ to $A_n$ and the signals of specified pattern $C_1$ to $C_n$, usually output the transmission data $A_1$ to $A_n$, but switch to output the signals of specified pattern $C_1$ to $C_n$ to the transmission sections $3_1$ to $3_n$ when the instruction signal described later has been supplied.

Distortion-compensation-type amplification section 6 collectively amplifies the output signals $B_1$ to $B_n$ and compensates intermodulation distortion components generated in the amplification step using the distortion compensation circuit 7.

Control section 8 and comprises the transmission monitoring section 9, the transmission control section 10 and the distortion compensation control section 11.

The transmission monitoring section 9 stores information corresponding to the transmission sections in use among the transmission sections $3_1$ to $3_n$ and a channel in use and transmits this information to the transmission control section 10.

Receiving a request of transmission from outside, the transmission section 10 assigns a channel to the frequency conversion sections $2_1$ to $2_n$ based on the information from the transmission monitoring section 9. Also, receiving a request for distortion compensation from the distortion compensation control section 11 and confirming two units of transmission sections not in use, it assigns a channel for distortion compensation to the confirmed two units of transmission sections based on the information from the transmission monitoring section 9, and simultaneously outputs an instruction signal to the switching sections corresponding to the two confirmed transmission sections. Moreover, it calculates a frequency at which distortion is generated and instructs a result to the distortion compensation circuit 7 based on the channel for distortion compensation assigned by the transmission control section 10. Here, the frequency at which distortion is generated is expressed by the following equation.

$$f = 2^* f_k \pm f_j \quad (1)$$

Where, $f_k$ is the transmission frequency of the transmission section $3_k$ and $f_j$ is the transmission frequency of the transmission section $3_j$.

Next, the operation of a movable communication base station system configured as above is explained.

First, the transmission control section 10 having received a request for transmission from outside confirms information on a status of used channels and use of the transmission sections $3_1$ to $3_n$ stored in the transmission monitoring section 9. Then, it assigns channels not in use to the frequency conversion sections not in use among the frequency conversion sections $2_1$ to $2_n$, and lets them carry out transmission.

Where, when receiving a request for distortion compensation from the distortion compensation control section 11, the transmission control section 10 analyzes information of the transmission monitoring section 9. If having confirmed two or more units not in use, it assigns a channel for distortion compensation to two arbitrary transmission sections, and simultaneously outputs an instruction signal to two switching sections corresponding to the two arbitrary transmission sections. In addition, it informs the distortion compensation control section 11 of the channel assigned for distortion compensation.

The distortion compensation control section 11 calculates a frequency at which distortion is generated based on the channel assigned for distortion compensation from the transmission control section 10, informs the distortion compensation circuit 7 of the calculated frequency.

The distortion compensation circuit 7 performs distortion compensation based on the frequency of the distortion compensation control section 11 and outputs of the transmission sections that have received specified signals.

For example, let suppose that the transmission sections $3_k$ ($1 \leq k \leq n$) and the transmission sections $3_j$ ($1 \leq j \leq n$) do not transmit any data.

When having received a request for distortion compensation from the distortion compensation control section 11, the transmission control section 10 confirms that the transmission sections $3_k$ and $3_j$ do not transmit any data based on a status information of use of the transmission sections $3_1$ to $3_n$ stored in the transmission monitoring section 9. Then it assigns a channel for distortion compensation to the frequency conversion section $2_k$ in the transmission section $3_k$ and the frequency conversion section $2_j$ in the transmission section $3_j$ and simultaneously outputs an instruction signal to the switching section $5_k$ and $5_j$.

By this operation, the signals of specified pattern $C_k$ and $C_j$ are supplied from the specified signal generation sections $4_k$ and $4_j$ to the transmission sections $3_k$ and $3_j$, and the output signals $B_k$ and $B_j$ become signals of constant amplitude and constant frequency. Then, the output signals $B_k$ and $B_j$ are supplied to the distortion-compensation-type common amplification section 6.

On the other hand, the transmission control section 10 assigns a channel for distortion compensation to the distortion compensation control section 11. The distortion compensation control section 11 calculates the frequency f at which distortion is generated based on the above-mentioned equation (1) and supplies the valve of this frequency to the distortion compensation circuit 7.

Next, the distortion compensation circuit 7 compensates for intermodulation distortion components based on the frequency f at which distortion is generated and the output signals $B_k$ and $B_j$.

Like this, the control section 8 makes two transmission sections that do not transmit any data receive signals of a specified pattern and the distortion compensation circuit 7 compensates distortion using a signal of constant amplitude and constant frequency, so intermodulation distortion caused by non-linearity of amplifier can be accurately compensated for.

What is claimed is:

1. A communication base station system for transmitting data to a movable body comprising:

a plurality of transmission means, each of said plurality of transmission means for receiving a transmission data, modulating the received transmission data, and generating an output signal by converting a frequency of the modulated transmission data to a preset transmission frequency;

a control means for controlling said plurality of transmission means, wherein if at least two of said plurality of transmission means are not in use, said control means outputs a respective specified signal instead of said transmission data to each of two of said plurality of transmission means among said at least two of said plurality transmission means;

an amplification means for collectively amplifying the output signal from each of said plurality of transmission means; and a compensation means for compensating for intermodulation distortion components generated in said amplification means based on respective preset transmission frequencies of said two of said plurality of transmission means and on respective output signals of said two transmission means.

2. The communication base station system of claim 1, wherein said respective specified signal is a signal of a specified pattern for making an output signal from a corresponding transmission means be a signal of constant amplitude and constant frequency.

3. The communication base station system of claim 1, wherein each of said transmission means comprises:

an orthogonal modulation means for receiving said transmission data, orthogonally modulating the received transmission data and outputting a modulated signal; and a frequency conversion means for receiving said modulated signal and converting a frequency of the modulated signal to a preset transmission frequency.

4. The communication base station system of claim 1, wherein said control means comprises an instruction means for calculating a frequency at which distortion is generated based on said respective preset transmission frequencies of said two transmission means and supplying the calculated frequency to said compensation means.

5. The communication base station system of claim 1, wherein said control means comprises a transmission frequency assigning means for assigning a preset transmission frequency to each of said plurality of transmission means.

6. The communication base station system of claim 1, wherein said control means comprises:

a specified signal output means for generating a first and second specified signal and outputting said first specified signal to one of said two transmission means and outputting said second specified signal to the other of said two transmission means upon receipt of an instruction signal; and a monitoring means for monitoring a status of use of said plurality of transmission means and outputting said instruction signal.

7. The communication base station system of claim 6, wherein said specified signal output means comprises:

a plurality of specified signal generation means corresponding to said plurality of transmission means, each of said specified signal generation means generating a specified signal; and a plurality of switching means corresponding to said plurality of specified signal generation means, each of said switching means receiving respective transmission data and a respective specified signal, said switching means selectively outputting one of said respective transmission data and said respective specified signal in accordance with said instruction signal.

8. The communication base station system of claim 6, wherein said specified signal output means comprises:

a plurality of specified signal generation means corresponding to said plurality of transmission means, each of said specified signal generation means generating a specified signal; and a plurality of switching means corresponding to said plurality of specified signal generation means, each of said switching means receiving respective transmission data and a respective specified signal, said switching means selectively outputting one of said respective transmission data and said respective specified signal in accordance with said instruction signal;

wherein said monitoring means is configured so as to monitor a status of use of said transmission means and to output said instruction signal.

9. The communication base station system of claim 1, wherein said transmission means and said control means maintain said preset transmission frequency as a channel.

10. A communication base station system transmitting data to a movable body comprising:

a plurality of transmission means, each of said plurality of transmission means having an orthogonal modulation means for receiving a transmission data, orthogonally modulating the transmission data and outputting a modulated signal and a frequency conversion means for receiving said modulated signal and converting the frequency of the modulated signal to an assigned transmission frequency;

a plurality of specified signal generation means corresponding to said plurality of transmission means, each of said plurality of specified signal generation means generating a specified signal;

a plurality of switching means corresponding to said plurality of special signal generation means, each of said plurality of switching means for receiving respective transmission data and a respective specified signal, and selectively outputting one of said respective transmission data and said respective specified signal in accordance with an instruction signal;

an amplification means for receiving output signals from said plurality of transmission means, collectively amplifying the received output signals and outputting the amplified signal;

a distortion compensation means for compensating for intermodulation distortion components generated in said amplification means;

a monitoring means for monitoring a status of use of said plurality of transmission means;

a transmission control means for receiving information from said monitoring means, and if at least two of said plurality of transmission means are not in use, assigning a transmission frequency for distortion compensation to two of said plurality of transmission means among said at least two of said transmission means, and simultaneously outputting said instruction signal to respective switching means corresponding to said two of said plurality of transmission means; and a distortion compensation control means for calculating a frequency which generates intermodulation distortion based on the respective transmission frequencies assigned by said transmission control means to the two of said plurality of transmission means, and controlling said distortion compensation means.

11. The communication base station system of claim 10, wherein said specified signal is a signal of a specified pattern for making an output signal from a respective transmission means be a signal of constant amplitude and constant frequency.

12. The communication base station system of claim 10, wherein said assigned transmission frequency is maintained as a channel.

13. A method of compensating for intermodulation distortion components in a communication system, comprising the steps of:

(1) generating output signals by supplying transmission data to a plurality of transmission means, each of the transmission means modulating the transmission data and converting the frequency of the modulated data to a pre-determined transmission frequency;

(2) monitoring a status of use of said plurality of transmission means, and if at least two of said plurality of transmission means are not in use, supplying a respective specified signal instead of said transmission data to two of said plurality of transmission means among the at least two of said plurality of transmission means; and (3) collectively amplifying the output signals from said transmission means and simultaneously compensating for intermodulation distortion components based on respective output signals of said two of said plurality of transmission means and respective transmission frequencies of said two of said plurality of transmission means.

14. The method of compensating for intermodulation distortion components in a communication system of claim 13, wherein said respective specified signal is a signal of specified pattern for making an output signal from a corresponding transmission means be a signal of constant amplitude and constant frequency.

15. The method of compensating for intermodulation distortion components in a communication system of claim 13, wherein step 9 (1) comprises:

receiving said transmission data, orthogonally modulating the received data transmissions and outputting a modulated signal; and receiving said modulated signal and converting a frequency of the modulated signal to a pre-determined transmission frequency.

16. The method of compensating for intermodulation distortion components in a communication system of claim 14, wherein step (2) further comprises calculating a frequency at which distortion is generated based on respective transmission frequencies of said two of said plurality of transmission means and supplying the calculated frequency to a compensation means.

17. The method of compensating for intermodulation distortion components in a communication system of claim 14, wherein step (2) comprises:

monitoring a status of use of said transmission means, and if at least two of said plurality of transmission means are not in use, assigning two of said plurality of transmission means among the at least two of said plurality transmission means for distortion compensation and outputting an instruction signal instructing a switch means to supply respective specified signals to the two assigned transmission means; and generating said respective specified signals and outputting said respective specified signals to said two assigned transmission means upon receipt of said instruction signal.

18. The method of compensating for intermodulation distortion components in a communication system of claim 14, wherein step (2) further comprises calculating a frequency at which distortion is generated based on respective transmission frequencies of said two of said plurality of transmission means and outputting an instruction to a distortion compensation means.

19. The method of compensating for intermodulation distortion components in a communication system of claim 14, wherein step (1) and step (2) maintain a transmission frequency as a channel.

20. A communication base station system comprising:

a plurality of transmission sections, each of said plurality of transmission sections receiving an input signal and generating an output signal by modulating said input signal and converting a frequency of the modulated input signal to a pre-determined transmission frequency;

a control section coupled to each of said plurality of transmission sections, said control section operative to supply one of a respective transmission data and a respective specified signal as said input signal, wherein, if at least two of said plurality of transmission sections are not in use, said control section supplies respective specified signals to two of said plurality of transmission sections among the at least two of said plurality of transmission sections not in use; and an amplification section for collectively amplifying the output signal of each of said plurality of transmission sections, said amplification section including a compensation section, wherein said compensation section compensates for intermodulation distortion generated by said amplification section based on respective pre-determined transmission frequencies of said two of said plurality of transmission sections and on respective output signals thereof.

21. The communication base station system of claim 20, wherein said respective specified signals are of a specified pattern configured such that said two of said plurality of transmission sections generate respective output signals of respective constant amplitudes and respective constant frequencies.

22. The communication base station system of claim 20, wherein said control section comprises:

a plurality of specified signal generation sections, each specified signal generation section generating a respective specified signal; and a plurality of switching sections, each respective one of said plurality of switching sections coupled between one of said plurality of specified signal generation sections and one of said plurality of transmission sections, wherein each respective one of said plurality of switching sections receives a respective transmission data and a respective specified signal, and wherein each respective one of said plurality of switching sections selectively outputs one of said respective transmission data and said respective specified signal in accordance with an instruction signal.

23. The communication base station system of claim 22, wherein said control section further comprises a monitor section which monitors said plurality of transmission sections and provides said instruction signal to each of a respective two of said plurality of switching sections coupled to said two of said plurality of transmission sections.

* * * * *